(12) United States Patent  
Horst

(10) Patent No.: US 7,705,484 B2  
(45) Date of Patent: Apr. 27, 2010

(54) ENERGY MANAGEMENT SYSTEM AND METHOD

(75) Inventor: Gale R. Horst, Watervliet, MI (US)

(73) Assignee: Whirlpool Corporation, Benton Harbor, MI (US)

(*) Notice: Subject to any disclaimer, the term of this patent is extended or adjusted under 35 U.S.C. 154(b) by 194 days.

(21) Appl. No.: 11/733,385

(22) Filed: Apr. 10, 2007

(65) Prior Publication Data

US 2008/0252141 A1 Oct. 16, 2008

(51) Int. Cl.
*H02J 1/00* (2006.01)
*H02J 1/04* (2006.01)
*H02J 3/14* (2006.01)

(52) U.S. Cl. ........................................... 307/35
(58) Field of Classification Search .............. 307/34–35, 307/38–39; 700/295
See application file for complete search history.

(56) References Cited

U.S. PATENT DOCUMENTS

| | | | |
|---|---|---|---|
| 3,925,680 A | 12/1975 | Dixon | |
| 4,090,088 A | 5/1978 | McMahon et al. | |
| 4,168,491 A | 9/1979 | Phillips et al. | |
| 4,247,786 A | 1/1981 | Hedges | |
| 4,293,915 A | 10/1981 | Carpenter et al. | |
| 4,336,462 A | 6/1982 | Hedges et al. | |
| 4,472,640 A | 9/1984 | Elmer | |
| 4,476,398 A | 10/1984 | Hallam | |
| 4,612,619 A | 9/1986 | Culp | |
| 4,771,185 A | 9/1988 | Feron et al. | |
| 4,819,180 A | 4/1989 | Hedman et al. | |
| 4,829,159 A | 5/1989 | Braun et al. | |
| 4,847,781 A | 7/1989 | Brown, III et al. | |
| 4,847,782 A | 7/1989 | Brown, Jr. et al. | |
| 4,998,024 A | 3/1991 | Kirk et al. | |
| 5,017,799 A | 5/1991 | Fishman | |
| 5,168,170 A | 12/1992 | Hartig | |
| 5,272,585 A | 12/1993 | Gibbs | |
| 5,359,540 A | 10/1994 | Ortiz | |

(Continued)

FOREIGN PATENT DOCUMENTS

DE 19541869 C1 1/1997

(Continued)

OTHER PUBLICATIONS

Household Response to Incentive Payment for Load Shifting: A Japanese Time-of-Day Electricity Pricing Experiment.:, Isamu et al, Energy Journal, 21, 1, 73, Jan. 2000.

(Continued)

*Primary Examiner*—Albert W Paladini
*Assistant Examiner*—Carlos Amaya
(74) *Attorney, Agent, or Firm*—Robert A. Bacon; McGarry Bair P.C.

(57) ABSTRACT

An energy management system comprises at least one energy consuming device and an energy controller. The energy controller supplies energy to the energy consuming device and transmits an energy curtailment signal in response to an energy over-consumption condition. In one embodiment, the curtailment signal can be directed to a predetermined class of energy consuming device. In another embodiment, the energy consuming device can determine whether to curtail energy consumption in response to the curtailment signal. The energy controller can be in the form of a power strip.

32 Claims, 5 Drawing Sheets

U.S. PATENT DOCUMENTS

| | | | |
|---|---|---|---|
| 5,424,903 | A | 6/1995 | Schreiber |
| 5,436,510 | A | 7/1995 | Gilbert |
| 5,481,140 | A | 1/1996 | Maruyama et al. |
| 5,483,656 | A | 1/1996 | Oprescu et al. |
| 5,502,339 | A | 3/1996 | Hartig |
| 5,506,790 | A | 4/1996 | Nguyen |
| 5,543,667 | A | 8/1996 | Shavit et al. |
| 5,544,036 | A | 8/1996 | Brown, Jr. et al. |
| 5,572,438 | A | 11/1996 | Ehlers et al. |
| 5,579,201 | A | 11/1996 | Karageozian |
| 5,581,132 | A | 12/1996 | Chadwick |
| 5,659,601 | A | 8/1997 | Chelog |
| 5,754,445 | A | 5/1998 | Jouper et al. |
| 5,761,083 | A | 6/1998 | Brown, Jr. et al. |
| 5,831,345 | A | 11/1998 | Michaud |
| 5,844,326 | A | 12/1998 | Proctor et al. |
| 5,880,677 | A | 3/1999 | Lestician |
| 6,018,690 | A | 1/2000 | Saito et al. |
| 6,018,726 | A | 1/2000 | Tsumura |
| 6,028,977 | A | 2/2000 | Newsome |
| 6,111,762 | A | 8/2000 | Igarashi et al. |
| 6,150,955 | A | 11/2000 | Tracy et al. |
| 6,169,964 | B1 | 1/2001 | Aisa et al. |
| 6,177,739 | B1 | 1/2001 | Matsudaira et al. |
| 6,178,393 | B1 | 1/2001 | Irvin |
| 6,181,985 | B1 | 1/2001 | O'Donnell et al. |
| 6,195,018 | B1 | 2/2001 | Ragle et al. |
| 6,216,956 | B1 | 4/2001 | Ehlers et al. |
| 6,301,674 | B1 | 10/2001 | Saito et al. |
| 6,329,616 | B1 | 12/2001 | Lee |
| 6,369,643 | B1 | 4/2002 | Lee et al. |
| 6,487,509 | B1 | 11/2002 | Aisa |
| 6,493,643 | B1 | 12/2002 | Aisa |
| 6,519,509 | B1 | 2/2003 | Nierlich et al. |
| 6,583,521 | B1 | 6/2003 | Lagod et al. |
| 6,590,304 | B1 | 7/2003 | Manning et al. |
| 6,621,179 | B1 | 9/2003 | Howard |
| 6,622,097 | B2 | 9/2003 | Hunter |
| 6,624,532 | B1 | 9/2003 | Davidow et al. |
| 6,631,622 | B1 | 10/2003 | Ghent et al. |
| 6,633,823 | B2 | 10/2003 | Bartone et al. |
| 6,681,154 | B2 | 1/2004 | Nierlich et al. |
| 6,718,214 | B1 | 4/2004 | Schoettle et al. |
| 6,734,806 | B1 | 5/2004 | Cratsley, III |
| 6,741,442 | B1 | 5/2004 | McNally et al. |
| 6,745,106 | B2 | 6/2004 | Howard et al. |
| 6,751,562 | B1 | 6/2004 | Blackett et al. |
| 6,795,707 | B2 | 9/2004 | Martin et al. |
| 6,839,717 | B1 | 1/2005 | Motoyama et al. |
| 6,861,621 | B2 | 3/2005 | Ghent |
| 6,891,478 | B2 | 5/2005 | Gardner |
| 6,904,385 | B1 | 6/2005 | Budike, Jr. |
| 6,931,003 | B2 | 8/2005 | Anderson |
| 6,940,272 | B2 | 9/2005 | Niv |
| 6,961,642 | B2 | 11/2005 | Horst |
| 6,988,375 | B2 | 1/2006 | Bashark |
| 7,034,707 | B2 * | 4/2006 | Aisa ........................... 340/662 |
| 7,058,524 | B2 | 6/2006 | Hayes et al. |
| 7,110,832 | B2 | 9/2006 | Ghent |
| 7,280,893 | B2 | 10/2007 | Spool et al. |
| 7,324,876 | B2 | 1/2008 | Ying |
| 7,370,013 | B1 | 5/2008 | Aziz et al. |
| 2001/0049846 | A1 | 12/2001 | Guzzi et al. |
| 2002/0019758 | A1 | 2/2002 | Scarpelli |
| 2002/0019802 | A1 | 2/2002 | Malme et al. |
| 2003/0036822 | A1 | 2/2003 | Davis et al. |
| 2003/0055776 | A1 | 3/2003 | Samuelson |
| 2003/0168389 | A1 | 9/2003 | Astle et al. |
| 2003/0187550 | A1 | 10/2003 | Wilson et al. |
| 2003/0233201 | A1 | 12/2003 | Horst et al. |
| 2004/0043754 | A1 | 3/2004 | Whewell |
| 2004/0078154 | A1 | 4/2004 | Hunter |
| 2004/0083112 | A1 | 4/2004 | Horst |
| 2004/0133314 | A1 | 7/2004 | Ehlers et al. |
| 2004/0153170 | A1 | 8/2004 | Santacatterina et al. |
| 2004/0235451 | A1 | 11/2004 | Whewell et al. |
| 2005/0097902 | A1 * | 5/2005 | Kwon et al. .................. 62/126 |
| 2005/0116543 | A1 | 6/2005 | Merdjan |
| 2005/0280969 | A1 | 12/2005 | Reynolds |
| 2005/0280970 | A1 | 12/2005 | Reynolds |
| 2006/0060512 | A1 | 3/2006 | Astle et al. |
| 2007/0130278 | A1 | 6/2007 | Baek et al. |

FOREIGN PATENT DOCUMENTS

| | | |
|---|---|---|
| DE | 19824168 A1 | 2/1999 |
| DE | 19850496 A1 | 5/2000 |
| EP | 0620631 A1 | 10/1994 |
| GB | 2095879 A | 10/1982 |
| WO | 0227687 A1 | 4/2002 |
| WO | 03/094321 A1 | 11/2003 |

OTHER PUBLICATIONS

Asian Electronics Ltd., Glossary, 2003, pp. 1-6.
http://www.hrm.uh.edu/docs/pdf/Nextel%20Plans.pdf.
Merriam Webster's Dictionary of Synonyms, 1984, Merriam-Webster, Incorporated, p. 13.
"Utility Control Algorithm", Jan. 1, 1986, vol. 28, issue 8, pp. 3657-3660.
U.S. Appl. No. 10/460,885, filed Jun. 13, 2003; Total Home Energy Management; first named inventor Gale Richard Horst.
U.S. Appl. No. 10/280,902, filed Oct. 25, 2002; Method and Apparatus for Managing Resources of Utility Provider; first named inventor Gale R. Horst.
U.S. Appl. No. 10/757,891, filed Jan. 15, 2004; A Process for Managing and Curtailing Power Demand of Appliances and Components Thereof, and System Using Such Process; first named inventor Gianpiero Santacatterina.
U.S. Appl. No. 10/447,359, filed May 29, 2003; Electronic System for Power Consumption Management of Appliance; first named inventor Matteo Santinato.

* cited by examiner

ENERGY MANAGEMENT SYSTEM AND METHOD

BACKGROUND OF THE INVENTION

1. Field of the Invention

The invention relates to an energy management system and method for managing the supply of energy to one or more energy consuming devices in response to an energy over-consumption condition.

2. Description of the Related Art

Due to increased usage of energy consuming devices in the home or office, there can be more energy consuming devices than available power outlets at a given location, such as in a room or other area of the home or office. Users often employ power strips or other energy management systems to accommodate the electrical plugs of all of the energy consuming devices. However, problems arise when the energy demand of the energy consuming devices exceeds the available power, such as when the energy consuming devices are concurrently operated.

SUMMARY OF THE INVENTION

An energy management system according to one embodiment of the invention comprises at least one energy consuming device and an energy controller supplying energy to the at least one energy consuming device and configured to transmit a class-specific energy curtailment signal for a predetermined class of energy consuming device in response to an energy over-consumption condition. The at least one energy consuming device comprises a device controller coupled to the energy controller to receive the class-specific curtailment signal and determine whether to curtail energy consumption in response to the class-specific energy curtailment signal.

An energy management system according to another embodiment of the invention comprises at least one energy consuming device and an energy controller supplying energy to the at least one energy consuming device and configured to transmit an energy curtailment signal in response to an energy over-consumption condition. The at least one energy consuming device comprises a device controller coupled to the energy controller to receive the curtailment signal, determine whether to curtail energy consumption in response to the energy curtailment signal, and curtail energy supplied to the energy consuming device if the energy over-consumption condition exists following transmission of the energy curtailment signal.

A power strip according to one embodiment of the invention comprises an inlet electrical connector configured to be plugged into a wall socket to receive an input of electricity; a plurality of outlet electrical connectors coupled to the inlet electrical connector for receiving the electricity and configured to receive an electrical plug of an energy consuming device for transmission of the electricity from the inlet electrical connector to the energy consuming device; and a controller controlling the input of electricity from the inlet electrical connector to the outlet electrical connectors and configured to transmit, in response to an energy over-consumption condition, a class-specific energy curtailment signal for a predetermined class of energy consuming device to the outlet electrical connectors and thereby any energy consuming devices plugged into the outlet electrical connectors.

DESCRIPTION OF EMBODIMENTS OF THE INVENTION

An energy management system according to one embodiment of the invention comprises an energy controller to manage the supply of energy to one or more energy consuming devices in response to an energy over-consumption condition. In the event of the over-consumption condition, the energy controller transmits an energy curtailment signal, which can be a signal directed to a specific class of energy consuming devices. In one embodiment, the energy consuming devices determine whether to curtail energy consumption in response to the curtailment signal. In another embodiment, the energy controller has the ability to curtail the energy supply if the over-consumption condition exists following transmission of the energy curtailment signal. These and other embodiments of the invention are described below with reference to the figures.

The energy management system and method reduces instantaneous demand for resources and can be employed in conjunction with any type of device that consumes a resource such as electricity, water, or gas. For exemplary purposes, the energy management system and method are described below with respect to the management of electricity, with it being understood that the energy management system and method can be applied to other resources.

Figure 1:
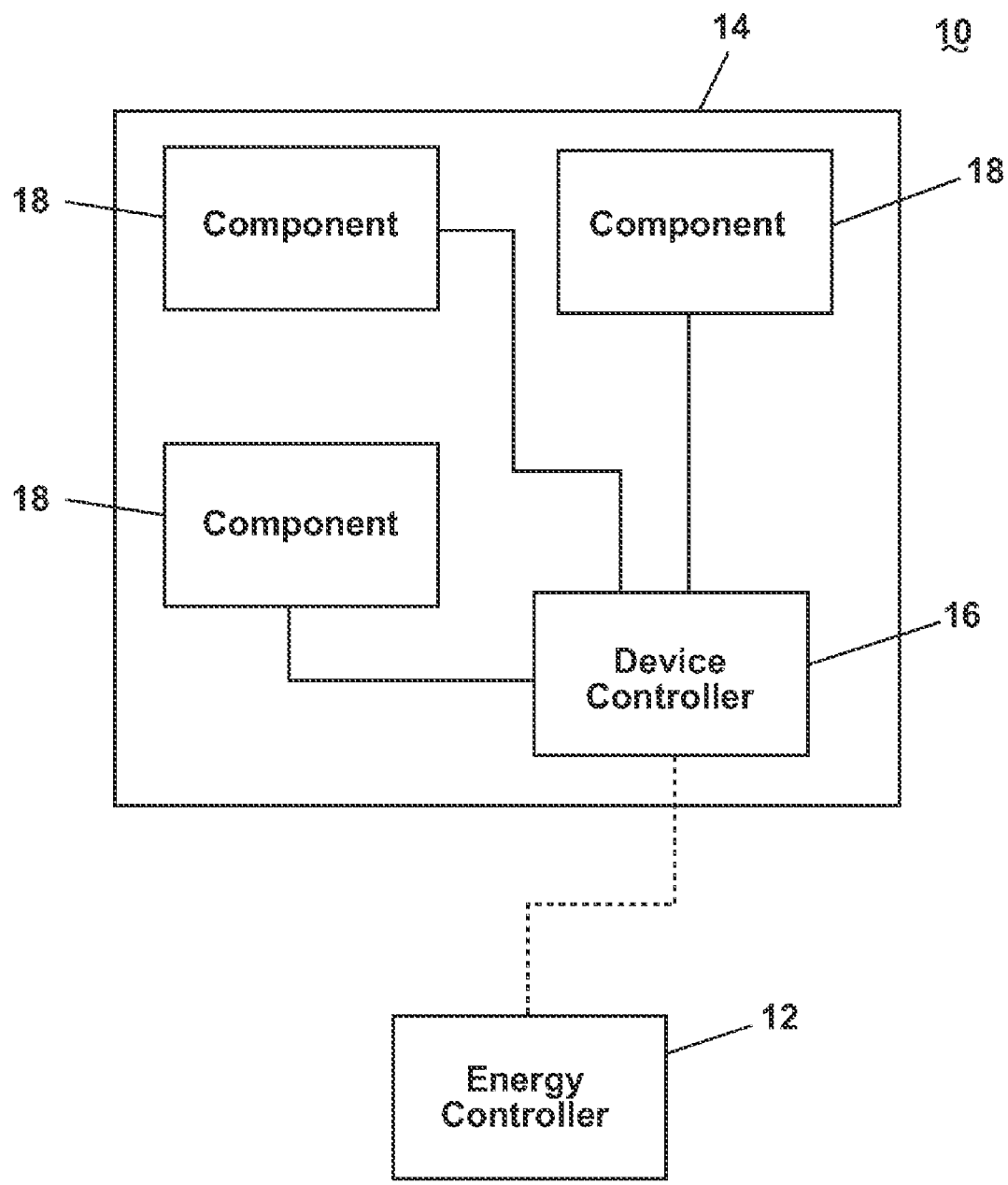
FIG. 1 is a schematic view of an energy management system according to one embodiment of the invention comprising an energy controller and an energy consuming device.

Referring to the figures, FIG. 1 is a schematic view of an energy management system 10 according to one embodiment of the invention comprising an energy controller 12 and an energy consuming device 14. The energy consuming device 14 includes a device controller 16 operatively coupled to one or more components 18 for controlling the operation of the components 18 and thereby the operation of the energy consuming device 14.

The energy consuming device can be any suitable device that consumes energy during the operation of the device. Examples of the energy consuming device include, but are not limited to, household appliances, such as a washing machine, a clothes dryer, a clothes refreshing and/or revitalizing machine, an iron, a steamer, an oven, a range, a cooktop, a microwave oven, a dishwasher, a refrigerator, a freezer, a hot water heater, a thermostat, a motor, a pump, a heating/ventilation/cooling infrastructure, or other similar devices; audio-video devices, such as a television, a VCR, a DVD player, a receiver, a DVR, a CD player, or other similar devices; and computer devices and accessories. Other examples of energy consuming devices are described in U.S. patent application Ser. No. 11/323,125, filed Dec. 30, 2005, which is incorporated herein by reference in its entirety.

The components can be any functioning component in the energy consuming device. Examples of components in a household appliance include, but are not limited to, compressors, motors, valves, motor driven components, lighting components, heating components, cooling components, water consuming components, and gas consuming components.

Figure 2:
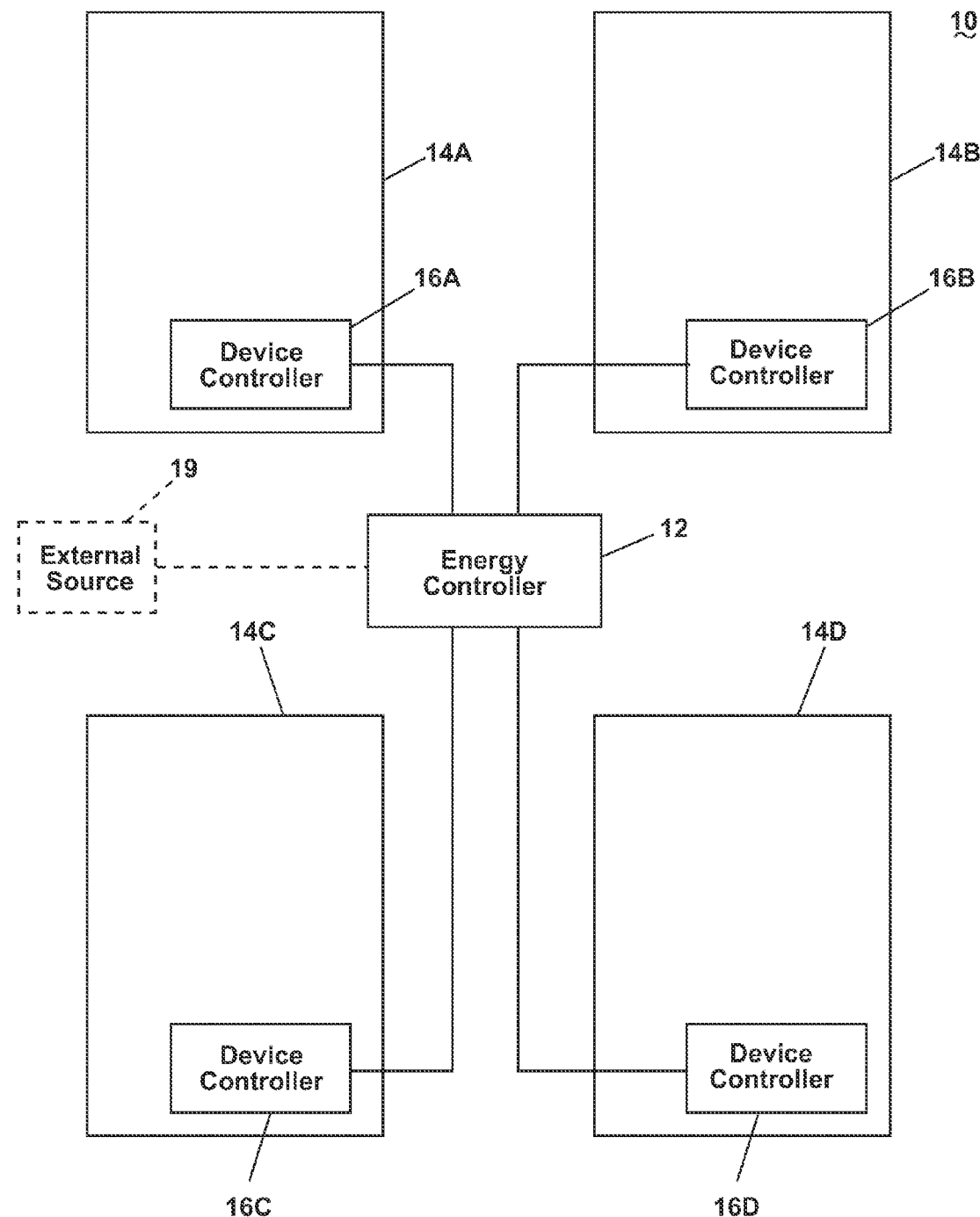
FIG. 2 is a schematic view of the energy management system of FIG. 1 comprising a plurality of the energy consuming devices.

The energy management system 10 can comprise the single energy consuming device 14, as illustrated in FIG. 1, or a plurality of the energy consuming devices 14A, 14B, 14C, 14D, as shown in FIG. 2. The following description of the energy management system 10 is presented with respect to the plurality of the energy consuming devices 14A-14D, with it being understood that the energy management system 10 can comprise any suitable number of energy consuming devices.

The energy controller 12 is operatively coupled to the energy consuming devices 14A-14D. For example, the energy controller 12 can be operatively coupled to the device controllers 16A-16D of the corresponding energy consuming devices 14A-14D. The energy controller 12 can be configured to monitor energy consumption of the energy consuming devices 14A-14D, such as by monitoring a total current draw from the energy consuming devices 14A-14D, and to send an energy curtailment signal, such as via a power line carrier signal or a wireless signal, to the energy consuming devices 14A-14D if the energy consumption exceeds a predetermined threshold or if an energy over-consumption condition is otherwise detected. In the current embodiment, the energy over-consumption condition corresponds to a condition where power consumption approaches or exceeds the available power. The manner in which the curtailment signal is sent is not germane to the invention. Any suitable method can be used.

The energy curtailment signal can be directed to all of the energy consuming devices 14A-14D coupled to the energy controller 12 or to a specific class of energy consuming devices. The device classes can be defined in any desired manner, and, in one embodiment, the device classes can be based on user interaction with the energy consuming device during operation of the energy consuming device. For purpose of class definitions, the operation of the energy consuming device comprises the operation of the energy consuming device after the user has entered desired operating parameters, if applicable, and initiated the operating process, if applicable.

Examples of device classes based on user interaction include non-interactive, interactive, and semi-interactive classes. The non-interactive class includes energy consuming devices with which the user does not generally interact during normal operation. Because the user does not interact with the energy consuming device during normal operation, the user does not notice or is not negatively affected by changes or interruptions in the operation of the energy consuming device. Examples of home appliances in the non-interactive class include a clothes dryer and a water heater. The interactive class includes energy consuming devices with which the consumer interacts throughout its useful operation. Interruptions or changes in operation of the interactive energy consuming devices have a high likelihood of being noticed by the user. Examples of home appliances in the interactive class include an iron and a hair dryer. The semi-interactive class includes energy consuming devices with which the user interacts depending on the operational state of the energy consuming device. The user would be affected by an interruption or change in operation of the energy consuming device if the interruption or change occurs while the user interacts with the energy consuming device. Examples of home appliances in the semi-interactive class include an oven, a microwave oven, and a clothes washer.

In addition to the device classes based on user interaction, the device classes can include a non-interruptible class, which can include energy consuming devices that are essential for security or for which an interruption or change in operation would cause damage to the energy consuming device. An example of energy consuming devices in the non-interruptible class is a home security system.

The device classes can be static, where the device class for the energy consuming device does not change, or dynamic, where the device class changes depending on a current operational state of the energy consuming device. For example, the energy consuming device can be assigned to a particular device class, such as the non-interactive, interactive, semi-interactive, and non-interruptible device classes, based on typical user interaction with the energy consuming device during operation of the energy consuming device, and the assigned device class can be static, i.e., does not change, during actual operation of the energy consuming device. On the other hand, the device class can be dynamic, i.e., changes, during the actual operation of the energy consuming device. For example, the device class of the energy consuming device can change from one of the device classes to another of the device classes during the actual operation of the energy consuming device depending on whether the energy consuming device is in an operational state during which the user interacts with the energy consuming device and/or the degree of user interaction with the energy consuming device during the operational state. If the energy consuming device is in an operational state during which the user interacts with the energy consuming device, then the device class can change to a device class corresponding to a higher level of user interaction. Similarly, if the energy consuming device is in an operational state during which the user does not interact with the energy consuming device, then the device class can change to a device class corresponding to a lower level of user interaction.

The class-specific energy curtailment signal can be transmitted by the energy controller 12 based on a priority of the classes. For example, the energy controller 12, upon detection of the over-consumption condition, can transmit the class-specific energy curtailment signal for the lowest priority device class. If the over-consumption condition remains following transmission of the class-specific energy curtailment signal for the lowest priority class, then the energy controller 12 can transmit the class-specific energy curtailment signal for the next lowest priority class, and so on. The exemplary device classes described above can be prioritized from lowest to highest as non-interactive class, semi-interactive class, and interactive class to avoid or reduce negative effects of energy curtailment on the user.

The energy consuming device 14A-14D can be a smart energy consuming device. For example, the energy consuming devices 14A-14D can each have intelligence to determine whether the class-specific energy curtailment signal for a predetermined class is directed to the corresponding class of the particular energy consuming device 14A-14D. If the energy consuming device 14A-14D, particularly the device controller 16A-16D, determines that the class-specific energy curtailment signal is directed to the class of the energy consuming device 14A-14D, then the energy consuming device 14A-14D, particularly the device controller 16A-16D, can determine whether the energy consuming device 14A-14D will curtail its energy consumption in response to the class-specific energy curtailment signal. A selection of curtailing the energy consumption results in an energy curtailment action that reduces energy consumption, such a by changing an operating state (e.g., high to low or on to off) of one or more of the components of the energy consuming device, or eliminates energy consumption, such as by stopping or pausing operation of the energy consuming device. A selection of not curtailing the energy consumption results in no action by the energy consuming device to reduce or eliminate energy consumption.

The decision of whether to curtail the energy consumption can be based on any suitable factor. For example, the energy consuming device 14A-14D can choose not to curtail energy if the curtailment would potentially cause damage to user content in the energy consuming device 14A-14D or to the energy consuming device 14A-14D itself. Another exemplary reason for not responding with an energy curtailment action is if the curtailment action would cause the energy consuming device 14A-14D to fail to perform its intended function, such as a complete drying of the clothes in a dryer, complete cooking of food in a cooking appliance or complete cleaning of clothes in a washing machine.

The energy consuming device 14A-14D can make the determination of whether to curtail the energy consumption without notifying the energy controller 12 of the determination or, alternatively, with notifying the energy controller 12 of the determination. In the former case, the energy controller 12 can observe whether any of the energy consuming devices 14A-14D has curtailed energy consumption by monitoring the energy consumption and observing any changes in the energy consumption.

When the energy consuming devices 14A-14D are smart energy consuming devices, the energy controller 10 can transmit the class-specific energy curtailment signal to all of the energy consuming devices 14A-14D, and each of the energy consuming devices 14A-14D determines whether the class-specific energy curtailment signal is intended for the energy consuming device 14A-14D. Alternatively, the energy consuming device 14A-14D can communicate to the energy controller 12 the device class of the corresponding energy consuming device 14A-14D, such as when the energy consuming device 14A-14D couples with the energy controller 12, and the energy controller 12 can thereafter transmit the class-specific energy curtailment signal only to the device class associated with the class-specific energy curtailment signal.

In an embodiment where the energy consuming devices 14A-14D determine whether the class-specific energy curtailment signal is directed to the device class of the energy consuming devices 14A-14D and make the determination of whether to curtail the energy consumption without notifying the energy controller 12 of the determination, communication between the energy controller 12 and the energy consuming devices 14A-14D is substantially one-way or unidirectional from the energy controller 12 to the energy consuming devices 14A-14D. As a result, the energy controller 12 can be manufactured with less intelligence and a reduced cost.

As described above, the energy consuming devices 14A-14D can optionally determine whether the class-specific energy curtailment signal is intended for the device class of the respective energy consuming devices 14A-14D and, if the class-specific energy curtailment signal is intended for the device class of the respective energy consuming devices 14A-14D, determine whether to curtail energy consumption. As another option, the energy consuming devices 14A-14D can have the ability to determine whether to curtail energy consumption when the class-specific energy curtailment signal is intended for a device class other than the device class of the respective energy consuming devices 14A-14D. For example, an "interactive" or "semi-interactive" energy consuming device can receive the energy curtailment signal intended for the "non-interactive" energy consuming devices, and in response, the interactive or semi-interactive energy consuming device can determine whether to curtail the energy consumption to aid in relieving the energy over-consumption condition even though the energy curtailment signal is not specifically intended for interactive or semi-interactive energy consuming device. The interactive or semi-interactive energy consuming device, for example, can determine which components are not critical or least critical to interaction with the user and shut down or reduce energy consumption (e.g., dim lighting) of these components. In this example, the energy curtailment signal to one of the device classes can be considered an energy curtailment notification, partial energy curtailment signal, or alternative energy curtailment signal to the other device classes. The energy curtailment notification can be a notice to energy consuming devices having device classes other than the device class of the class-specific energy curtailment signal that the energy over-consumption condition exists so that the energy consuming devices having the other device classes can optionally reduce energy consumption to aid in alleviating the energy over-consumption condition.

The energy management system 10 can also include dumb or unintelligent energy consuming devices, or devices that are not capable of receiving and responding to the class-specific energy curtailment signal. Upon transmission of the energy curtailment signal, the dumb energy consuming devices would not perform an energy curtailment action, and the energy controller 10, therefore, would not detect energy curtailment and would treat the dumb energy consuming device similar to a smart energy consuming device that has chosen not to respond to the energy curtailment signal.

The energy controller 12 can further have the capability of curtailing energy supply if the energy over-consumption condition remains following transmission of the energy curtailment signal. The curtailing of the energy supply corresponds to the energy controller 12 reducing or eliminating energy supply to one or more of the energy consuming devices 14A-14D so that the energy consumption falls below a level corresponding to the energy over-consumption condition. The curtailing of the energy supply can optionally be executed according to the priority of the device classes. The energy controller 12 can curtail the energy supply in any desired manner, such as by reducing the energy supply to one energy consuming device, a set of energy consuming devices, such as a set of energy consuming devices belonging to the same device class, or all of the energy consuming devices; eliminating the energy supply to one energy consuming device, a set of energy consuming devices, such as a set of energy consuming devices belonging to the same device class, or all of the energy consuming devices; or a combination thereof.

To prevent curtailment of energy supply to the energy consuming devices in the non-interruptible class, the energy controller 12 can include uncontrolled or priority electrical connectors, which can be coupled to the energy consuming devices belonging to the non-interruptible class. The energy controller 12 does not have the ability to curtail the energy supply to the uncontrolled electrical connectors. The energy supply to the uncontrolled electrical connectors can only be curtailed in the event of a tripped circuit breaker or other event, such as a power outage, outside the control of the energy controller 12.

In the above description of the energy management system 10, the energy controller 12 determines the presence of the energy over-consumption condition and transmits the energy curtailment signal in response to the energy over-consumption condition. However, it is within the scope of the invention for the energy management system 10 to optionally include an external source 19, as shown by dashed lines in FIG. 2, coupled to the energy controller 12 for communicating to the energy controller 12 an external energy curtailment signal instead of or in addition to the energy controller 12 determining the presence of the energy over-consumption condition. The external energy curtailment signal can be transmitted to the energy controller 12 by the external source 19 in response to the external source 19 detecting an energy over-consumption condition. Upon receiving the external energy curtailment signal from the external source 19, the energy controller 12 can proceed with transmitting the energy curtailment signal to the energy consuming devices 14A-14D as described above. An example of the external source 19 is a power utility. The external source 19 need not be external to the household corresponding to the energy consuming devices 14A-14D; the external source 19 is described as "external" as it is external to the energy controller 12.

Figure 3:
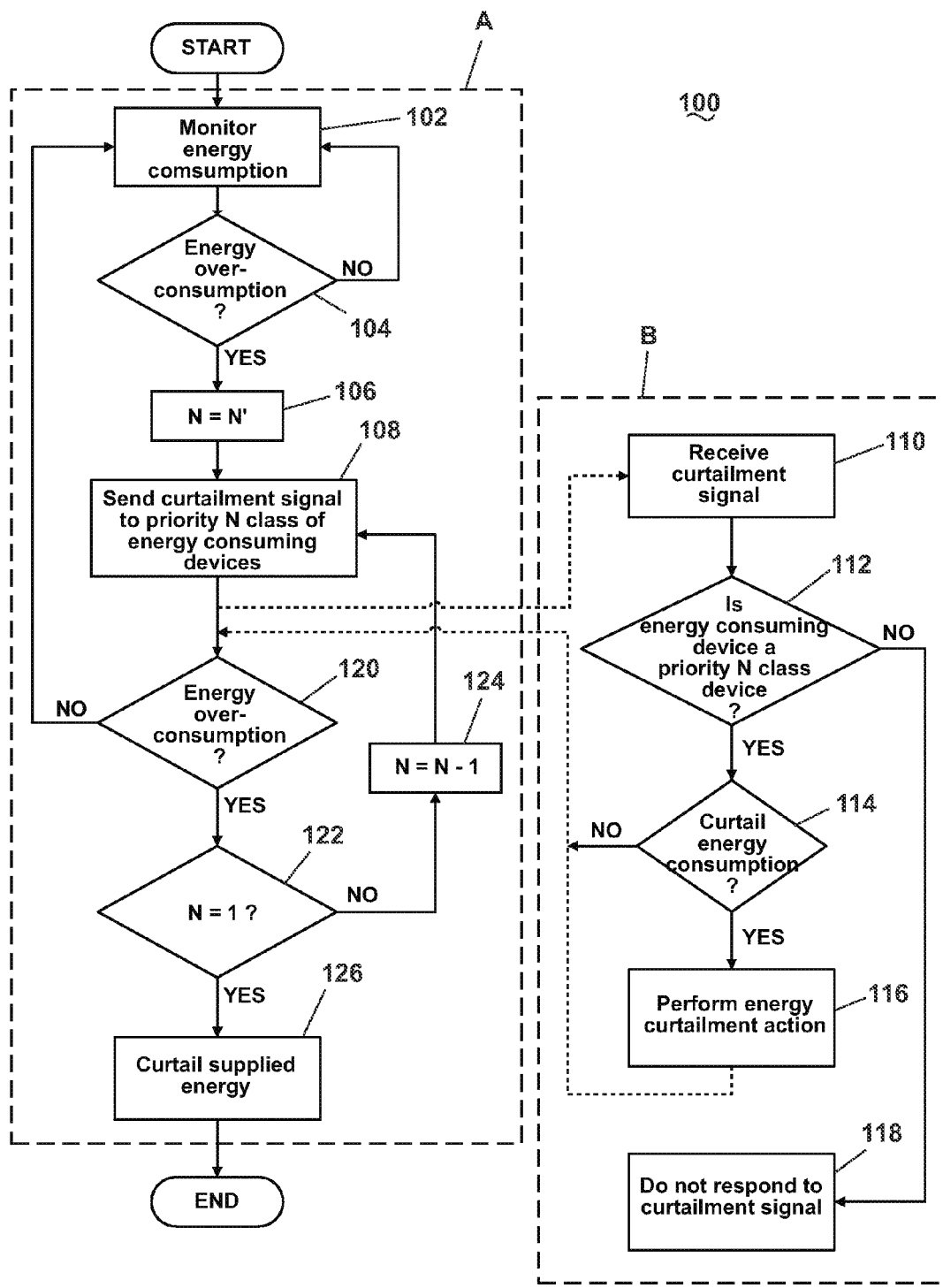
FIG. 3 is a flowchart of a method of operating the energy management system of FIGS. 1 and 2 according to one embodiment of the invention.

A flowchart of an exemplary method 100 of operating the energy management system 10 of FIGS. 1 and 2 according to one embodiment of the invention is presented in FIG. 3. The exemplary method 100 is provided for illustrative purposes only and is not intended to limit the invention in any manner. In the flowchart, a portion of the method 100 executed by the energy controller 12 is identified by a box labeled A, and a portion of the method executed by the energy consuming devices 14A-14D is identified by a box labeled B.

The method 100 begins in box A with a step 102 of the energy controller 12 monitoring the energy consumption of the energy consuming devices 14A-14D of the energy management system 10. The monitoring of the energy consumption can be a continuous process or can occur at periodic time intervals. While the energy controller 12 monitors the energy consumption, the energy controller 12 determines if the energy over-consumption condition exists in step 104, which can also be a continuous process or can occur at predetermined time intervals. If the over-consumption condition exists, then the energy controller proceeds to step 106 to set a priority value N equal to a priority value corresponding to a lowest priority device class. Exemplary priority values of the exemplary device classes provided above are non-interactive=3, semi-interactive=2, and non-interactive=1, wherein a higher N value corresponds to a lower priority device class. Using these exemplary priority values, the priority value N would be set equal to 3 in the step 106. The energy controller 12 then transmits the energy curtailment signal for the device class N in step 108 to the energy consuming devices 14A-14D.

Referring now to box B, the energy consuming devices 14A-14D receive the energy curtailment signal in step 100 and determine, in step 112, whether the energy consuming device 14A-14D belongs to the class corresponding to the energy curtailment signal. If the energy consuming device 14A-14D does not belong to the class corresponding to the energy curtailment signal, then the energy consuming device 14A-14D proceeds to step 118 and does not response to the energy curtailment signal. On the other hand, if the energy consuming device 14A-14D does belong to the class corresponding to the energy curtailment signal, then the energy consuming device 14A-14D proceeds to step 114 and determines whether to curtail energy consumption. If the energy consuming device 14A-14D chooses to opt-out or not to respond the energy curtailment signal with an energy curtailment action, then the method 100 returns to box A; however, if the energy consuming device 14A-14D chooses to respond the energy curtailment signal, then the energy consuming device 14A-14D proceeds to step 116 and performs an energy curtailment action before the method 100 returns to box A.

Referring again to box A, after the energy controller 12 has transmitted the energy curtailment signal and the energy consuming devices 14A-14D have received, processed, and possibly responded to the energy curtailment signal, the energy controller 12 determines in step 120 whether the energy over-consumption condition still exists. If the energy over-consumption condition no longer remains, likely due to energy curtailment actions taken by the energy consuming devices 14A-14D, then the method 100 returns to the step 102 and restarts. However, the if energy over-consumption condition still remains, either because the energy consuming devices 14A-14D did not respond to the energy curtailment signal or the energy curtailment actions were not sufficient to bring the energy consumption below the energy over-consumption level, then the energy controller determines in step 122 whether the priority value N is equal to the priority value of the highest priority class, which, in the exemplary embodiment, has a value of 1. If the priority value N is not equal to the priority value N of the highest priority class, then the energy controller 12 in step 124 increments the priority value N to the next highest class, which, in the exemplary embodiment, can be executed by subtracting 1 from the priority value N to redefine the priority value N. The method then returns to the step 108, and the energy controller 12 transmits an energy curtailment signal to the device class having the redefined priority value N. This process continues until either the energy over-consumption condition no longer exists when evaluated at the step 120, in which case the method 100 returns to the step 102, or until the energy controller 12 determines in the step 122 that the priority value N corresponds to the highest priority device class. In the latter case, the energy controller 12 has transmitted the energy curtailment signal to all of the device classes, and the energy consuming devices 14A-14D did not respond to the energy curtailment signal or the energy curtailment actions of the energy consuming devices 14A-14D collectively were not sufficient to bring the energy consumption below the energy over-consumption level. In response to the continued existence of the energy over-consumption condition after transmission of the energy curtailment signal to all device classes, the energy controller 12 curtails the energy supply to the energy consuming devices 14A-14D, as described above, in step 126. In particular, the energy controller 12 can, for example, eliminate or reduce power supply to one, a set, or all of the energy consuming devices 14A-14D. Optionally, the energy controller 12 can sequentially curtail the energy supplied to the energy consuming devices 14A-14D according to the device class priority.

Figure 4:
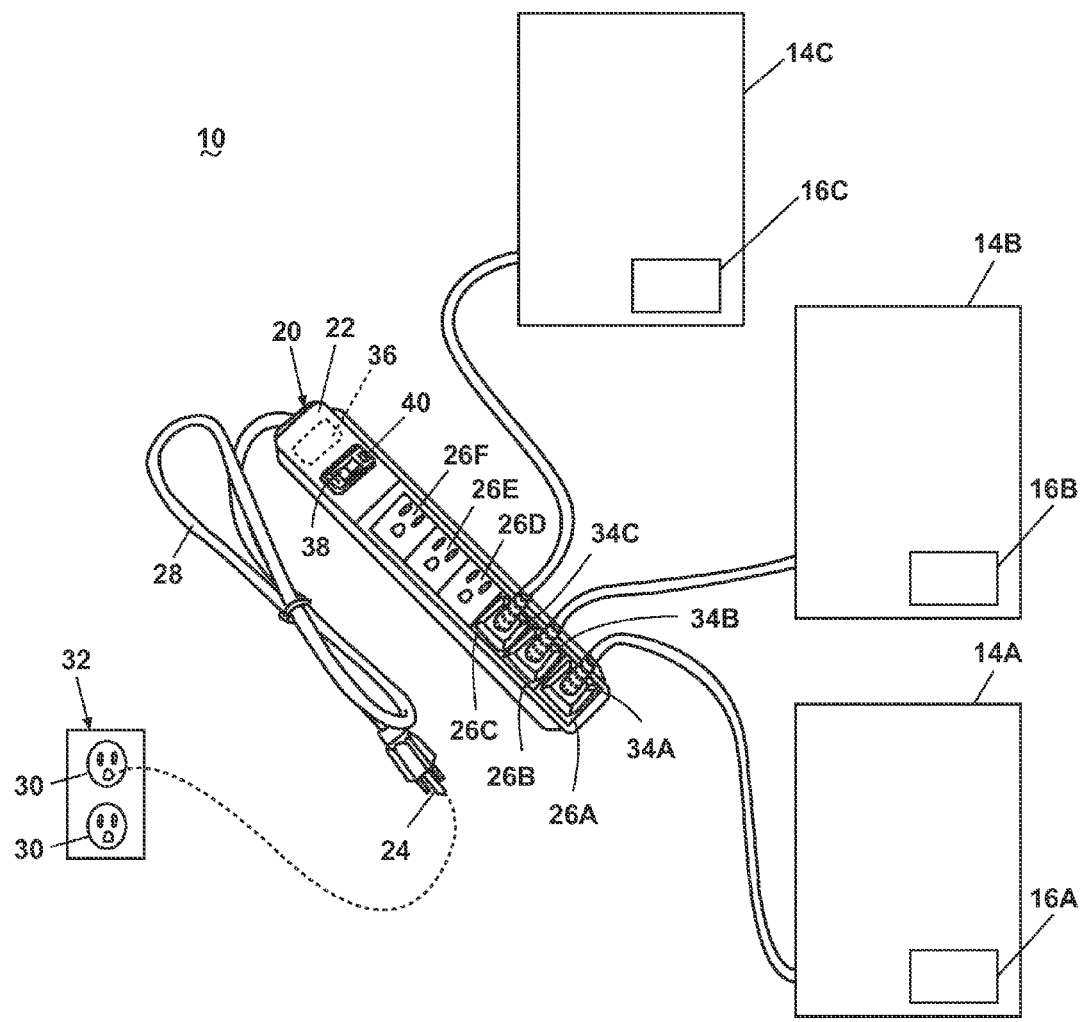
FIG. 4 is a schematic view of an implementation of the energy management system of FIGS. 1 and 2, wherein the energy controller is in the form of a power strip.

The energy controller 12 can assume any suitable form and can be internal to the energy consuming device 14A-14D or external to the energy consuming device 14A-14D. One exemplary form for the energy controller 12 is a power strip 20. An exemplary embodiment of the power strip 20 is illustrated in FIG. 4. The power strip 20 includes a housing 22, an inlet electrical connector 24, and a plurality of outlet electrical connectors 26A-26F. A cord 28 couples the inlet electrical connector 24 to the housing 22. The inlet electrical connector 24 can be configured as a plug for receipt within a socket 30 of a conventional electrical wall socket assembly 32 or other electrical device with a socket, such as an extension cord, for receiving an input of electricity from an energy source. The outlet electrical connectors 26A-26F can be configured as sockets for receiving corresponding plugs 34A-34C of the energy consuming devices 14A-14C and supplying energy or electricity to the energy consuming devices 14A-14C. Furthermore, the outlet electrical connectors 26A-26F can comprise all controlled outlets or a combination of controlled and uncontrolled outlets. The power strip 20 further includes a controller 36 in operative communication with the controllers 16A-16C of the energy consuming devices 14A-14C plugged into the outlet electrical connectors 26A-26C. The controller 36 controls the input of electricity from the inlet electrical connector 24 to the outlet electrical connectors 26A-26F and can be mounted within the housing 22 or can be located external to the housing 22. The power strip 20 also comprises a manual power switch 38 and a circuit breaker 40, as is common in conventional power strips.

While FIG. 4 illustrates three of the energy consuming devices 14A-14C coupled to three of the six outlet electrical connectors 26A-26F, it is within the scope of the invention for any number of energy consuming devices 14A-14C to be coupled to the outlet electrical connectors 26A-26F and for the power strip 20 to have any suitable number of the outlet electrical connectors 26A-26F.

The power strip 20 can function in the same manner as described above for the energy management system 10 of FIG. 2, with the power strip controller 36 executing the functions of the energy controller 12 to monitor energy consumption, transmit energy curtailment signals when the energy over-consumption condition exists, and curtailing the energy supply when the energy over-consumption condition remains after transmission of the energy curtailment signals. Further, the energy curtailment signal can be class-specific as described above.

Figure 5:
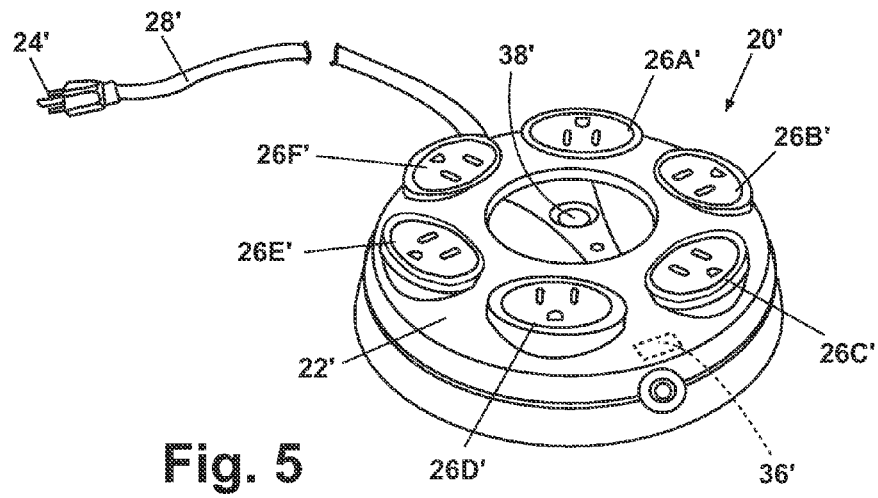
FIG. 5 is a perspective view of the energy controller of FIG. 4 in the form of a first alternative power strip according to another embodiment of the invention.
Figure 6:
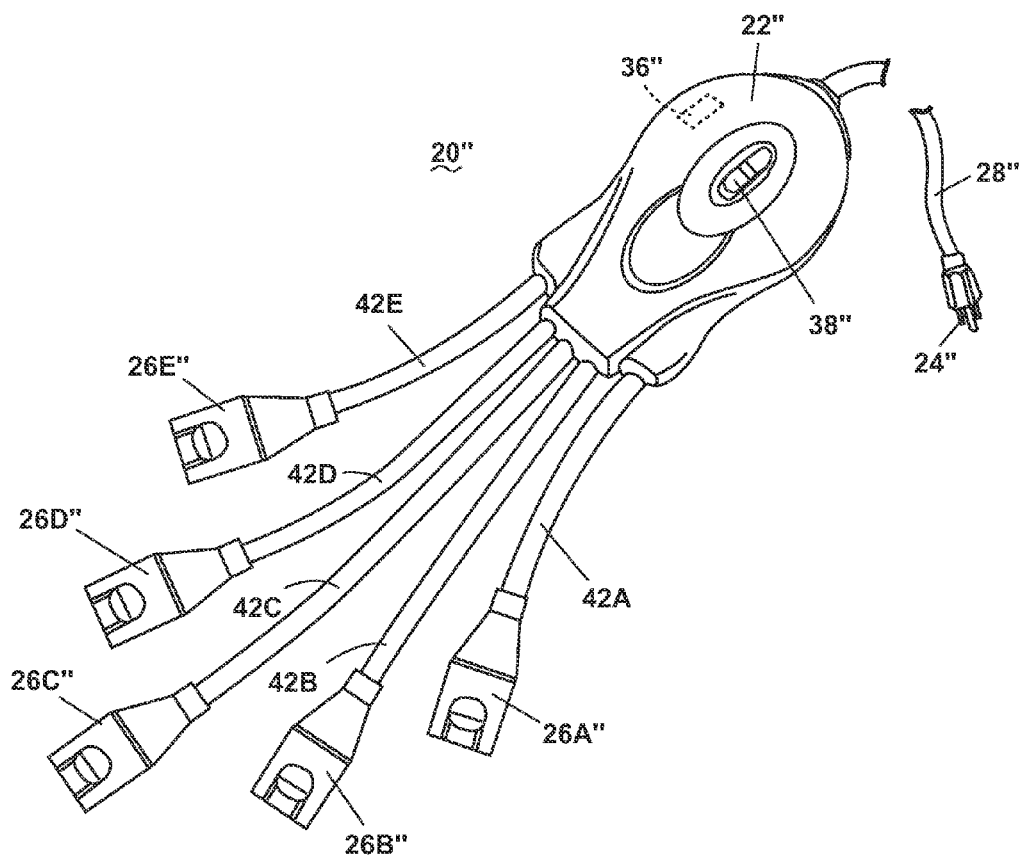
FIG. 6 is a perspective view of the energy controller of FIG. 4 in the form of a second alternative power strip according to another embodiment of the invention.

FIGS. 5 and 6 illustrate other embodiments of exemplary power strips 20', 20" that can function as energy controllers. In FIGS. 5 and 6, elements similar to those of the power strip in FIG. 4 are identified with the same reference numeral bearing a prime (') or double prime (") symbol, respectfully. The power strip 20' is identical to the power strip 20, except that the housing is circular rather than rectangular. The power strip 20" is also identical to the power strip 20, except that the housing 22" is irregularly shaped, and the outlet electrical connectors 26A"-26E" are coupled to the housing by cords 42A-42E rather than being integrated into the housing 22". Thus, the energy controller 12 in the form of the power strip is not limited to a strip-shaped housing; rather, the term power "strip" has used been herein as it is the term commonly used to describe single input, multiple output electrical devices.

The energy management system described herein can be scaled up or down, depending on the application of the energy controller. For example, the energy controller can be employed in relationship with a single appliance, wherein the energy controller can be considered an appliance energy controller, with multiple appliances in a single household, wherein the energy controller can be considered a home energy controller, and with multiple households in a community, wherein the energy controller can be considered a community energy controller. Thus, in each of these exemplary applications, the energy consuming devices can be considered, respectively, components of a single appliance, multiple appliances in a home, or multiple homes in a community. When the energy controller is the community energy controller for managing the energy for the homes, the individual homes can each include the home energy controller for managing the energy for the appliances in the home, and so on.

While the invention has been specifically described in connection with certain specific embodiments thereof, it is to be understood that this is by way of illustration and not of limitation, and the scope of the appended claims should be construed as broadly as the prior art will permit.

What is claimed is:

1. An energy management system comprising:
   at least one energy consuming device; and
   an energy controller supplying energy to the at least one energy consuming device and configured to transmit a class-specific energy curtailment signal for a predetermined class of energy consuming device in response to an energy over-consumption condition;
   wherein the at least one energy consuming device comprises a device controller coupled to the energy controller to receive the class-specific energy curtailment signal, determine whether the at least one energy consuming device is within the predetermined class, and to curtail energy consumption when the at least one energy consuming device is within the predetermined class.

2. The energy management system of claim 1 wherein the predetermined class is one of a plurality of device classes that depend on a degree of user interaction with the energy consuming device during operation of the energy consuming device.

3. The energy management system of claim 2 wherein the device classes comprise a non-interactive class corresponding to energy consuming devices with which the user does not interact during operation of the energy consuming device.

4. The energy management system of claim 2 wherein the device classes comprise an interactive class corresponding to energy consuming devices with which the user interacts during operation of the energy consuming device.

5. The energy management system of claim 2 wherein the device classes comprise a semi-interactive class corresponding to energy consuming devices with which the interaction of the user with the energy consuming device depends on an operation state of the energy consuming device.

6. The energy management system of claim 1 wherein the predetermined class is one of a plurality of device classes that comprise a non-interruptible class corresponding to energy consuming devices that are configured to not act in response to the energy curtailment signal.

7. The energy management system of claim 1 wherein the predetermined class is one of a plurality of device classes each having a class priority, and the energy controller is further configured to transmit the class-specific energy curtailment signal according to the priority of the device classes whereby the class associated with the energy curtailment signal changes to a higher priority class if the energy controller re-transmits the energy curtailment signal due to continued presence of the energy over-consumption condition.

8. The energy management system of claim 1 wherein the curtailment of the energy consumption comprises at least one of reducing and eliminating energy consumption of the energy consuming device.

9. The energy management system of claim 1 wherein the energy controller is further configured to curtail energy supplied to the energy consuming device if the energy over-consumption condition exists following transmission of the class-specific energy curtailment signal.

10. The energy management system of claim 1, further comprising a plurality of the energy consuming devices, each belonging to at least one class of a plurality of device classes and comprising a device controller coupled to the energy controller to receive the class-specific curtailment signal, determine whether the energy consuming device is within the predetermined class, and to curtail energy consumption to the energy consuming device within the predetermined class.

11. The energy management system of claim 10 wherein the curtailment of the energy consumption comprises at least one of reducing and eliminating energy consumption of the energy consuming device.

12. The energy management system of claim 10 wherein the energy controller is further configured to transmit the class-specific energy curtailment signal according to a priority of the device classes whereby the class associated with the energy curtailment signal changes to a higher priority class if the energy controller re-transmits the energy curtailment signal due to continued presence of the energy over-consumption condition.

13. The energy management system of claim 12 wherein the energy controller is further configured to curtail energy supplied to the energy consuming device if the energy over-consumption condition exists following transmission of the class-specific energy curtailment signal for the highest priority device class.

14. The energy management system of claim 1, wherein the energy consuming device comprises a household appliance.

15. The energy management system of claim 1 wherein the energy controller is a power strip.

16. The energy management system of claim 1 wherein the predetermined class is one of a plurality of dynamic device classes that depend on an operating state of the energy consuming device.

17. The energy management system of claim 1 wherein the class-specific energy curtailment signal functions as an energy curtailment notification for a device class other than the predetermined class of energy consuming device.

18. The energy management system of claim 1, further comprising an external source coupled to the energy controller and transmitting an external energy curtailment signal to the energy controller in response to the energy over-consumption condition.

19. A power strip comprising:
an inlet electrical connector configured to be plugged into a wall socket to receive an input of electricity;
a plurality of outlet electrical connectors coupled to the inlet electrical connector for receiving the electricity and configured to receive an electrical plug of an energy consuming device for transmission of the electricity from the inlet electrical connector to the energy consuming device; and
a controller controlling the input of electricity from the inlet electrical connector to the outlet electrical connectors and configured to transmit, in response to an energy over-consumption condition, a class-specific energy curtailment signal for a predetermined class of energy consuming device to the outlet electrical connectors and thereby any energy consuming devices plugged into the outlet electrical connectors,
wherein upon receipt of the class-specific energy curtailment signal by a device controller of an energy consuming device plugged into one of the outlet electrical connecters, the device controller determines whether the energy consuming device is within the predetermined class and curtails energy consumption when the energy consuming device is within the predetermined class.

20. The power strip of claim 19 wherein the predetermined class is one of a plurality of device classes that depend on a degree of user interaction with the energy consuming device during operation of the energy consuming device.

21. The power strip of claim 20 wherein the device classes comprise at least one of the following classes: a non-interactive class corresponding to energy consuming devices with which the user does not interact during operation of the energy consuming device, an interactive class corresponding to energy consuming devices with which the user interacts during operation of the energy consuming device, and a semi-interactive class corresponding to energy consuming devices with which the interaction of the user with the energy consuming device depends on an operation state of the energy consuming device.

22. The power strip of claim 19 wherein the predetermined class is one of a plurality of device classes comprising a non-interruptible class corresponding to energy consuming devices that are configured to not act in response to the energy curtailment signal.

23. The power strip of claim 19 wherein the predetermined class is one of a plurality of device classes, each having a class priority, and the controller is further configured to transmit the class-specific energy curtailment signal according to the priority of the device classes whereby the class associated with the energy curtailment signal changes to a higher priority class if the controller re-transmits the energy curtailment signal due to continued presence of the energy over-consumption condition.

24. The power strip of claim 23 wherein the controller is further configured to curtail energy supplied to the outlet electrical connectors if the energy over-consumption condition exists following transmission of the class-specific energy curtailment signal for the highest priority device class.

25. The power strip of claim 19 in combination with a smart energy consuming device belonging to at least one class of a plurality of device classes, the smart energy consuming device plugged into one of the outlet electrical connectors and configured to determine if the class-specific energy curtailment signal is directed to the device class of the smart energy consuming device and, if the class-specific curtailment signal is directed to the class of the energy consuming device, to curtail energy consumption in response to the class-specific energy curtailment signal.

26. The combination of claim 25 wherein the smart energy consuming device comprises a household appliance.

27. An energy management system, comprising:
a plurality of energy consuming devices;
an energy controller supplying energy to the plurality of energy consuming devices and configured to transmit a class-specific energy curtailment signal for a predetermined class of energy consuming device in response to an over-consumption condition;
a device controller provided in at least some of the plurality of energy consuming devices and coupled to the energy controller to receive the class-specific energy curtailment signal, determine whether the energy consuming device is within the predetermined class, and to curtail energy consumption when the at least one energy consuming device is within the predetermined class;
wherein the energy controller is further configured to curtail the energy supplied to at least one of the plurality of energy consuming devices not in the predetermined class if the energy over-consumption condition exists following transmission of the energy curtailment signal.

28. The energy management system of claim 27 wherein the curtailment of the energy consumption comprises at least one of reducing and eliminating energy consumption of the energy consuming device.

29. The energy management system of claim 27 wherein the energy consuming device is a household appliance.

30. The energy management system of claim 27 wherein the energy controller is a power strip.

31. The energy management system of claim 27 wherein the curtailment of the energy supplied to the energy consuming device comprises at least one of reducing and eliminating energy supplied to the energy consuming device.

32. The energy management system of claim 27, wherein the at least one of the plurality of energy consuming devices not in the predetermined class is in a second predetermined class.

* * * * *